United States Patent [19]

Illgen

[11] 4,321,755
[45] Mar. 30, 1982

[54] PLUMB BOB HOLDER
[76] Inventor: Lester Illgen, Rte. 2 - Box 34, Lockport, Ill. 60441
[21] Appl. No.: 128,703
[22] Filed: Mar. 10, 1980
[51] Int. Cl.³ .............................................. G01C 15/10
[52] U.S. Cl. .................................... 33/393; 242/85.1; 224/269; 224/904
[58] Field of Search .......... 33/413, 414, 391, 392–393, 33/394; 224/904, 252, 268, 269; 242/85.1

[56] References Cited
U.S. PATENT DOCUMENTS

| D. 237,459 | 11/1975 | Wagner | 242/85.1 X |
| 1,022,791 | 4/1912 | Laird | 224/904 |
| 1,098,033 | 5/1914 | Friendship | 33/413 |
| 1,910,597 | 5/1933 | Elliott | 242/85.1 |
| 2,149,758 | 3/1939 | Burns | 224/904 X |
| 2,475,745 | 7/1949 | Humlegard | 33/393 |
| 2,593,042 | 4/1952 | Lynskey | 224/918 |
| 2,757,698 | 8/1956 | Goodman | 224/918 X |

FOREIGN PATENT DOCUMENTS 882595  7/1959  United Kingdom ................. 33/393

Primary Examiner—Harry N. Haroian
Attorney, Agent, or Firm—Ernest S. Kettelson

[57] ABSTRACT

An improved plumb bob holder, comprising a stiff wire frame formed to provide a spool section for the cord, a storage rack section to hold the plumb bob, and a clip section to clip the plumb bob holder to a workman's belt.

6 Claims, 5 Drawing Figures

PLUMB BOB HOLDER

BACKGROUND OF THE INVENTION

This invention relates to the field of devices to hold plumb bobs and their cords neatly in place until ready for use.

A number of carriers and holders for plumb bobs are known to the prior art, including the one disclosed in my co-pending application Ser. No. 73,403. The invention of the present application includes an improved feature, namely the addition of a clip section to enable a workman to conveniently clip the plumb bob holder to his belt for ready access.

SUMMARY OF THE INVENTION

It is an object of the invention to provide a plumb bob holder comprising a stiff wire frame which includes a spool section for the cord, a rack section to hold the plumb bob, and a clip section to enable clipping the holder to the belt of a workman.

It is an object of the invention to provide a plumb bob holder of relatively inexpensive but durable construction.

DESCRIPTION OF PREFERRED EMBODIMENT

Figure 1:
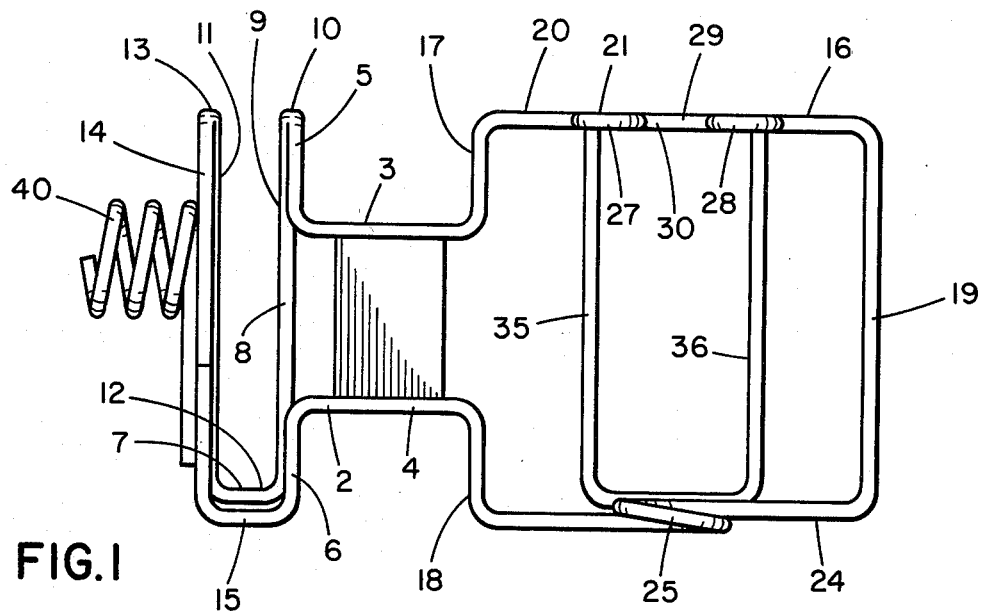
FIG. 1 is a front elevation view of a plumb bob holder in accordance with this invention.
Figure 2:
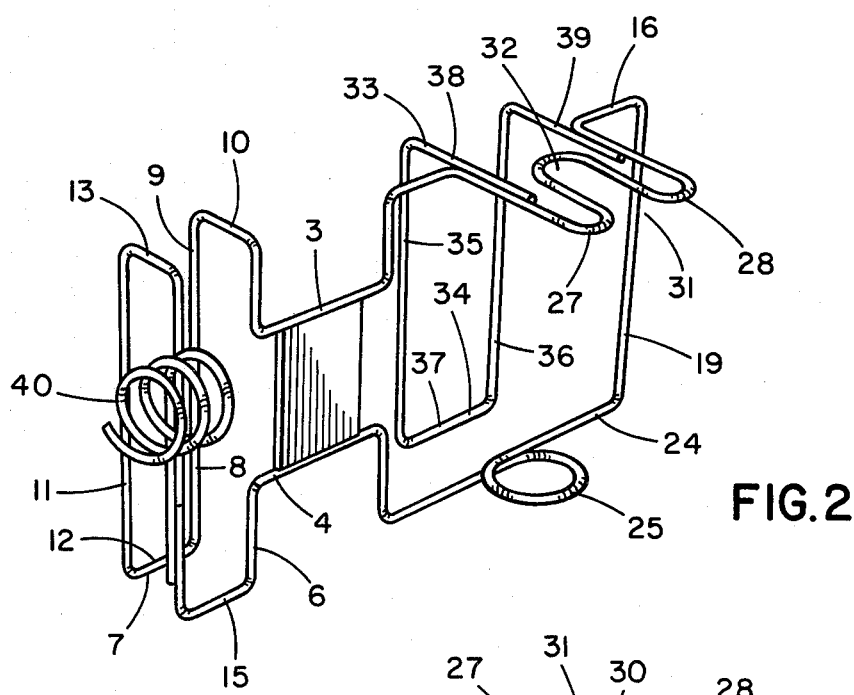
FIG. 2 is an isometric view of the plumb bob holder of FIG. 1.
Figure 4:
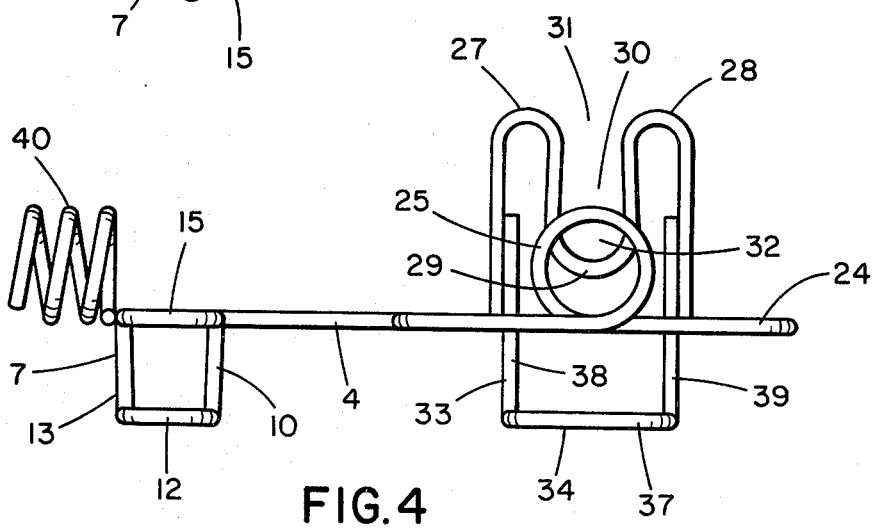
FIG. 4 is a bottom plan view of the plumb bob holder of FIG. 1.
Figure 3:
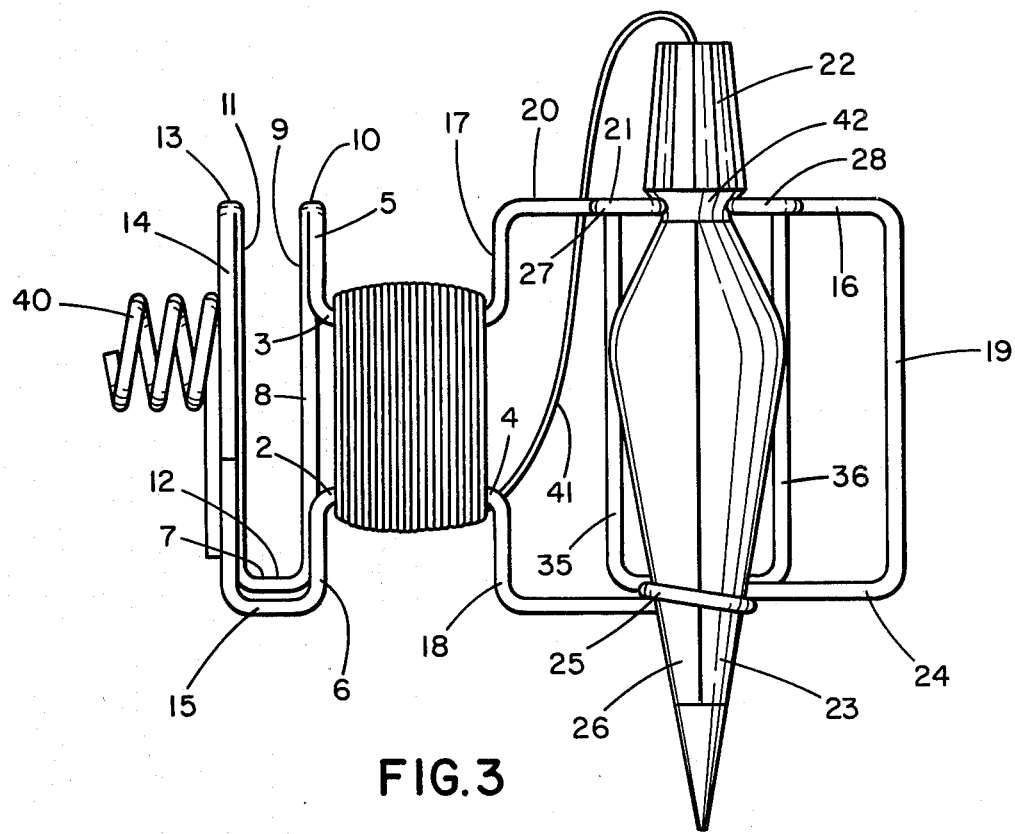
FIG. 3 is a front elevation view of the plumb bob holder of FIG. 1 having a plumb bob held therein.
Figure 5:
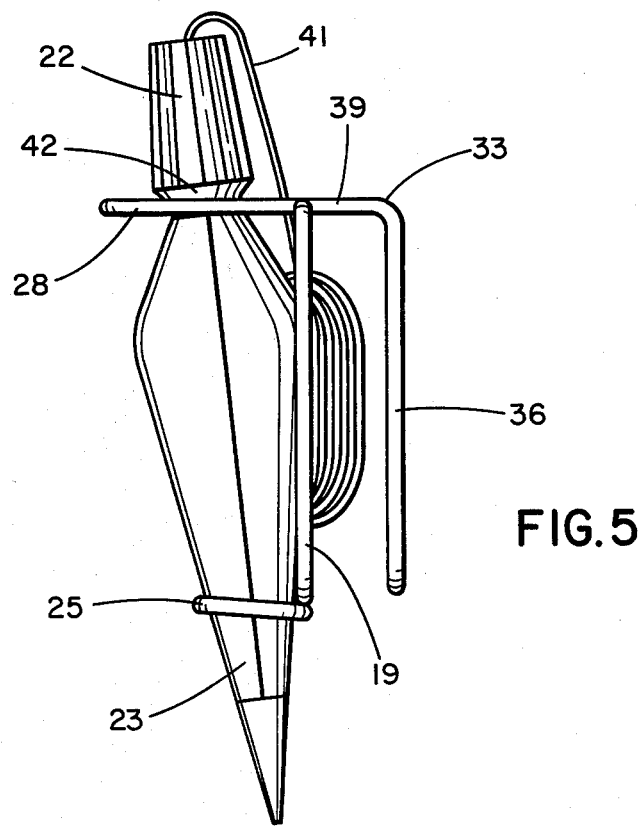
FIG. 5 is a side elevation view of the plumb bob holder of FIG. 1 having a plumb bob held therein.

A plumb bob holder in accordance with this invention includes a frame which may be formed of relatively stiff but bendable wire.

A spool section 2 is formed by a pair of spaced apart cross-arms 3 and 4 extending at substantially right angles from integrally joined respective legs 5 and 6 of a first clip section.

The first clip section 7 comprises a rearwardly positioned U-shaped member 8 having a first elongated leg 9 integrally connected at its upper end to arcuate spacing section 10 which in turn is integrally connected to the upper end of leg 5, and a second elongated leg 11 spaced apart from and parallel to the first elongated leg 9 with a lateral connecting section 12 integrally joining elongated legs 9 and 11 in spaced apart relation at their respective lower ends. The upper end of elongated leg 11 is integrally connected at its upper end to arcuate spacing section 13 which in turn is integrally connected to the upper end of a forwardly positioned elongated leg 14. The elongated leg 14 is spaced apart forwardly from the second elongated leg 11 of rearwardly positioned U-shaped member 8 and is substantially parallel thereto. A lateral connecting member 15 integrally joins the lower end of elongated leg 14 to the lower end of leg 6.

A storage rack section 16 is integrally connected to the opposite ends of cross-arms 3 and 4 of spool section 2, in the following manner.

A first short storage rack leg 17 extends upwardly from cross-arm 3 at substantially a right angle thereto, and a second short storage rack leg 18 extends downwardly from cross-arm 4 at substantially a right angle thereto. An elongated storage rack leg 19 is spaced apart from the first and second short legs 17 and 18 and extends substantially parallel thereto. The storage rack leg 19 is substantially the same length as the forwardly positioned elongated leg 14 of the first clip section 7.

Storage rack leg 19 is integrally connected to the first short storage rack leg 17 at their respective upper ends by a contoured length of wire 20 formed into a rack member 21 to receive and hold the head portion 22 of a plumb bob 23. Storage rack leg 19 is integrally connected to the second storage rack leg 18 at their respective lower ends by a length of wire 24 having formed therein a loop 25 to receive and hold a lower tapered portion 26 of the plumb bob 23.

The contoured length of wire 20 is formed into rack member 21 by forming a pair of forwardly extending loops 27 and 28 in spaced apart relationship, integrally joined at their rearward ends by arcuate connecting section 29. The spaced apart loops 27 and 28 define therebetween a receiving recess 30 to receive and hold therein the head portion 22 of plumb bob 23. The respective portions of loops 27 and 28 which bound the recess 30 are preferably arcuate in configuration to provide a relatively narrower entrance 31 to recess 30 and a relatively wider seating portion 32 of recess 30, the bounding portions of loops 27 and 28 curving arcuately in diverging directions from the entrance 31 to their respective integral connection to the arcuate connecting section 29.

A second clip section 33 extends rearwardly of the storage rack section 16 and comprises a U-shaped member 34 spaced apart rearwardly and in substantially parallel relation to the elongated storage rack leg 19 and the first and second short storage rack legs 17 and 18. The U-shaped clip member 34 comprises a pair of elongated legs 35 and 36 extending upwardly in spaced apart relationship integrally connected at their lower ends by a cross-arm 37. The upper ends of elongated legs 35 and 36 are integrally connected to spacing members 38 and 39, respectively, which extend in a direction substantially normal to that of the elongated legs 35 and 36. The forwardly extending end portions of spacing members 38 and 39 are welded to loop members 27 and 28, respectively.

The plumb bob holder in accordance with this invention also includes an anchor member 40 comprising a coil of wire of two or three turns welded to the elongated leg 14 of first clip section 7.

In use, the cord 41 of a plumb bob 23 is wound on the spool section 2 when it is desired to store the plumb bob after having been used, and the tapered end 26 of the plumb bob 23 is inserted through the loop 25 of the storage rack section 16. At such time, the neck 42 of the head portion 22 of plumb bob 23 is aligned with the entrance 31 of recess 30. The neck portion 42 is then pushed into the entrance 31 between the spaced apart loops 27 and 28 of storage rack section 16 causing them to spread apart sufficiently to enable the neck portion 42 to pass through into the seating portion 32 of recess 30. The wire construction of the plumb bob holder is sufficiently resilient to enable the loop sections 27 and 28 to spread apart under tension and to spring back to their original position after the spreading apart force has passed. In this manner, the head 22 of plumb bob 23 is held securely in the recess 30 after the neck 42 has passed the narrow entrance portion 31 and has become seated in the wider seating portion 32. The plumb bob is thus neatly secured in the plumb bob holder until it is desired to use again. The plumb bob holder may then be clipped to the belt around the waist of a user by inserting the rearwardly extending U-shaped members 8 and 34 of the first and second clip sections 7 and 33 inside of the belt of the user.

When it is desired to again use the plumb bob, the plumb bob holder may conveniently be lifted from the belt of the user, the head 22 of the plumb bob may be moved forwardly towards the entrance 31 of the recess between the loop sections 27 and 28 of the storage rack section 16. The loop members 27 and 28 are accordingly forced apart to allow the neck 42 of plumb bob 23 to pass and the tapered section 26 of plumb bob 23 is then lifted out of the loop 25 of the storage rack section 16. The cord 41 may then be unwound from the spool section 2 until the desired length of cord is obtained. The cord may then be anchored or tied to the anchor member 40 by wrapping around the coils thereof to hold the unwound cord at the desired length and to prevent unwinding of further cord from the spool section 2.

The plumb bob holder in accordance with this invention may be made from a single continuous length of wire bent into the various shapes as described above, except for the second clip section 33 which is formed separately and welded to the loop members 27 and 28.

I claim:

1. A holder for a plumb bob, comprising a first planar member, a spool section on said first planar member on which to wind the cord of a plumb bob, a rack supporting section on said first planar member, rack means extending outwardly in a first direction from said rack supporting section to receive and hold a plumb bob, a second planar member spaced apart in a second opposite direction from said first planar member and extending substantially parallel thereto, spacing means to connect said second planar member to said first planar member and hold the same in said spaced apart relationship, a channel between the first and second planar members, said channel being open at one end to receive a supporting structure in said channel and between said first and second planar sections to support said holder for a plumb bob thereon, wherein said spool section, said rack supporting section, said rack means and said second planar member are integrally joined, wherein said spool section, said rack supporting section, said rack means and said second planar member are formed from a single length of material.

2. A holder for a plumb bob, comprising a first planar member, a spool section on said first planar member on which to wind the cord of a plumb bob, a rack supporting section on said first planar member, rack means extending outwardly in a first direction from said rack supporting section to receive and hold a plumb bob, a second planar member spaced apart in a second opposite direction from said first planar member and extending substantially parallel thereto, spacing means to connect said second planar member to said first planar member and hold the same in said spaced apart relationship, a channel between the first and second planar members, said channel being open at one end to receive a supporting structure in said channel and between said first and second planar sections to support said holder for a plumb bob thereon, wherein said first planar member comprises a wire frame formed to include said spool section and said rack supporting section, said rack means comprising a pair of spaced apart loop members defining a receiving recess therebetween, said pair of spaced apart loop members being formed from said wire frame.

3. A holder for a plumb bob as set forth in claim 2, wherein said second member includes first and second clip members, said first clip member being formed from and integrally with said wire frame, said second clip member being formed separately and rigidly affixed to said first planar member.

4. A holder for a plumb bob as set forth in claim 2, wherein said pair of spaced apart loop members are resilient, said receiving recess therebetween includes an entrance portion and a seating portion, said entrance portion being narrower than said seating portion, said entrance portion being slightly narrower in dimension than the diameter of the neck portion of a plumb bob to be received in said recess whereby said resilient loop members may be spread apart when said neck portion of said plumb bob is received therein, said seating portion of said recess being slightly larger than the circumference of said neck of said plumb bob whereby said resilient loop members at said entrance portion of said recess move back to their original position when said neck of said plumb bob is seated in said seating portion of said recess.

5. A holder for a plumb bob as set forth in claim 4, including a ring member to receive therein the tapered end portion of said plumb bob, said ring member being spaced apart from and aligned with said recess between said pair of spaced apart loop members, said ring member being formed by a loop in a portion of said wire frame.

6. A holder for a plumb bob, comprising a first planar member, a spool section on said first planar member on which to wind the cord of a plumb bob, a rack supporting section on said first planar member, rack means extending outwardly in a first direction from said rack supporting section to receive and hold a plumb bob, a second planar member spaced apart in a second opposite direction from said first planar member and extending substantially parallel thereto, spacing means to connect said second planar member to said first planar member and hold the same in said spaced apart relationship, a channel between the first and second planar members, said channel being open at one end to receive a supporting structure in said channel and between said first and second planar sections to support said holder for a plumb bob thereon, wherein said spool section, said rack supporting section, said rack means and said second planar member are integrally joined, wherein said second planar member is a first clip member, including a second auxiliary clip member being separately formed and rigidly affixed to said first planar member to provide additional clipping support for said holder, wherein said spool section comprises a pair of spaced apart cross-arms formed in said first planar member at a location thereon between said first and second clip members.

* * * * *